(12) United States Patent
Mather et al.

(10) Patent No.: US 8,144,079 B2
(45) Date of Patent: Mar. 27, 2012

(54) MULTIPLE-VIEWER MULTIPLE-VIEW DISPLAY AND DISPLAY CONTROLLER

(75) Inventors: Jonathan Mather, Oxford (GB); David J. Montgomery, Bampton (GB); Graham R. Jones, Faringdon (GB); Diana U. Kean, Watlington (GB)

(73) Assignee: Sharp Kabushiki Kaisha, Osaka (JP)

( * ) Notice: Subject to any disclaimer, the term of this patent is extended or adjusted under 35 U.S.C. 154(b) by 1203 days.

(21) Appl. No.: 11/814,599

(22) PCT Filed: Jan. 25, 2006

(86) PCT No.: PCT/JP2006/301600
§ 371 (c)(1),
(2), (4) Date: Jul. 24, 2007

(87) PCT Pub. No.: WO2006/080540
PCT Pub. Date: Aug. 3, 2006

(65) Prior Publication Data
US 2008/0117233 A1    May 22, 2008

(30) Foreign Application Priority Data
Jan. 26, 2005   (GB) .................................. 0501469.1

(51) Int. Cl.
*G09G 3/00*     (2006.01)
(52) U.S. Cl. ............... 345/32; 359/462; 348/54; 349/15
(58) Field of Classification Search .................. 345/32, 345/33, 87, 88, 418, 419, 581, 600, 690; 359/237, 462, 463, 464, 618; 348/51–60, 348/207.99, 333.01; 349/15
See application file for complete search history.

(56) References Cited

U.S. PATENT DOCUMENTS

| 4,829,365 | A | 5/1989 | Eichenlab |
| 5,270,818 | A | 12/1993 | Ottenstein |
| 5,850,269 | A | 12/1998 | Kim |
| 5,867,322 | A * | 2/1999 | Morton ......................... 359/619 |
| 6,337,675 | B1 | 1/2002 | Toffolo et al. |
| 6,445,406 | B1 * | 9/2002 | Taniguchi et al. .............. 348/51 |

(Continued)

FOREIGN PATENT DOCUMENTS
EP        0 752 610 A2    1/1997
(Continued)

OTHER PUBLICATIONS

International Search Report for corresponding Application No. PCT/JP2006/301600 mailed Apr. 4, 2006.

(Continued)

*Primary Examiner* — Lun-Yi Lao
*Assistant Examiner* — Tom Sheng
(74) *Attorney, Agent, or Firm* — Renner, Otto, Boisselle & Sklar, LLP

(57) ABSTRACT

Techniques are disclosed for reducing the visibility of crosstalk between images in a multiple view display for simultaneously displaying two or more images independently of each other for viewing in different directions by different viewers. A multiple view display typically comprises a liquid crystal panel (20) and a parallax barrier (21) forming a dual view display for two viewers. The panel (20) comprises an array of pixels of elongate shape and arranged so as to be elongate in the horizontal direction of the normal image orientation on the panel (20). Crosstalk compensation may be provided in a display controller for the display.

23 Claims, 10 Drawing Sheets

U.S. PATENT DOCUMENTS

| | | | |
|---|---|---|---|
| 6,573,928 B1 * | 6/2003 | Jones et al. | 348/51 |
| 7,098,824 B2 * | 8/2006 | Yang et al. | 341/131 |
| 7,492,348 B2 * | 2/2009 | Matsuda | 345/107 |
| 7,623,090 B2 * | 11/2009 | Ijzerman et al. | 345/32 |
| 2004/0218245 A1 | 11/2004 | Kean et al. | |
| 2004/0252374 A1 | 12/2004 | Saishu et al. | |
| 2004/0257531 A1 | 12/2004 | Hattori et al. | |

FOREIGN PATENT DOCUMENTS

| | | |
|---|---|---|
| EP | 0 822 441 A2 | 2/1998 |
| EP | 0 953 962 A2 | 11/1999 |
| GB | 2 278 223 | 11/1994 |
| GB | 2 305 048 | 3/1997 |
| GB | 2 309 609 | 7/1997 |
| GB | 2 311 905 | 10/1997 |
| GB | 2 315 902 | 2/1998 |
| GB | 2 317 734 | 4/1998 |
| GB | 2 320 156 | 6/1998 |
| GB | 2 336 963 | 11/1999 |
| GB | 2 341 033 | 3/2000 |
| GB | 2 389 730 | 12/2003 |
| GB | 2 396 070 | 6/2004 |
| GB | 2 403 367 | 12/2004 |
| GB | 2 403 637 | 1/2005 |
| GB | 2 403 863 | 1/2005 |
| GB | 2 403 864 | 1/2005 |
| JP | 60-224383 | 11/1985 |
| JP | 63-105583 | 5/1988 |
| JP | 02-185175 | 7/1990 |
| JP | 06-186526 | 7/1994 |
| JP | 08-331600 | 12/1996 |
| JP | 09-021979 | 1/1997 |
| JP | 10-221644 A | 8/1998 |
| JP | 2000-078617 A | 3/2000 |
| JP | 2004-206050 | 7/2004 |
| JP | 2004-287440 | 10/2004 |
| JP | 2004-294862 | 10/2004 |
| JP | 2005-010303 A | 1/2005 |
| WO | 03/005338 A1 | 1/2003 |
| WO | 2004/088996 | 10/2004 |

OTHER PUBLICATIONS

Great Britain Search Report for corresponding Application No. 0501469.1 dated Apr. 21, 2005.

Great Britain Search Report for corresponding Application No. 0501469.1 dated Apr. 23, 2005 (relating to claim 22).

Great Britain Search Report for corresponding Application No. 0501469.1 dated Apr. 23, 2005 (relating to claim 30).

Great Britain Search Report for corresponding Application No. 0501469.1 dated Apr. 23, 2005 (relating to claim 34).

Great Britain Search Report for corresponding Application No. 0501469.1 dated Apr. 23, 2005 (relating to claims 42, 48, and 52).

Great Britain Search Report for corresponding Application No. 0501469.1 dated Apr. 23, 2005 (relating to claim 62).

H. Yamamoto et al.; "Optimum Parameters and Viewing Areas of Stereoscopic Full-Color LED Display Using Parallax Barrier"; IEICE Trans. Electron.; vol. E83-C, No. 10; Oct. 2000; pp. 1632-1639.

Great Britain Search Report for corresponding Application No. 0501469.1 dated Aug. 23, 2005 (relating to claim 22). (Previously submitted on Oct. 22, 2007).

Great Britain Search Report for corresponding Application No. 0501469.1 dated Aug. 23, 2005 (relating to claim 30). (Previously submitted on Oct. 22, 2007).

Great Britain Search Report for corresponding Application No. 0501469.1 dated Aug. 23, 2005 (relating to claim 34). (Previously submitted on Oct. 22, 2007).

Great Britain Search Report for corresponding Application No. 0501469.1 dated Aug. 23, 2005 (relating to claims 42, 48, and 52). (Previously submitted on Oct. 22, 2007).

Great Britain Search Report for corresponding Application No. 0501469.1 dated Aug. 23, 2005 (relating to claim 62). (Previously submitted on Oct. 22, 2007).

International Search Report for corresponding Application No. PCT/JP2006/301600 mailed Apr. 4, 2006.

Form PCT/ISA/237, Apr. 4, 2006.

* cited by examiner

Cause 2: Optical

- Mostly diffraction or scattering at the barrier.

Cause 1: Electrical

- Parasitic capacitance in TFT

MULTIPLE-VIEWER MULTIPLE-VIEW DISPLAY AND DISPLAY CONTROLLER

TECHNICAL FIELD

The present invention relates to a multiple-viewer multiple-view display, which displays two or more images such that each image is visible from a different direction. The present invention also relates to a display controller.

BACKGROUND ART

General Background

For many years conventional single view display devices have been designed to be viewed by multiple users simultaneously. The display properties of the display device are made such that viewers can see the same good image quality from different angles with respect to the display. This is effective in applications where many users require the same information from the display, such as, for example, displays of departure information at airports and railway stations. However, there are many applications where it would be desirable for individual users to be able to see different information from the same display. For example, in a motor car or other vehicle, the driver may wish to view satellite navigation data while a passenger may wish to view a film. These conflicting needs could be satisfied by providing two separate display devices, but this would take up extra space and would increase the cost. Furthermore, if two separate displays were used in this example, it would be possible for the driver to see the passenger display if the driver moved his or her head, which would be distracting for the driver. As a further example, each player in a computer game for two or more players may wish to view the game from his or her own perspective. This is currently done by each player viewing the game on a separate display screen so that each player sees their own unique perspective on individual screens. However, providing a separate display screen for each player takes up a lot of space, is costly, and is not practical for portable games.

To solve these problems, multiple-viewer multiple-view directional displays are being developed. One application of a multiple-viewer multiple-view directional display is as a 'dual-view display', which can simultaneously display two or more different images, with each image being visible only in a specific direction. Thus, an observer viewing the display device from one direction will see one image whereas an observer viewing the display device from another, different direction will see a different image. A display that can show different images to two or more users provides a considerable saving in space and cost compared with use of two or more separate displays.

Examples of possible applications of multiple-viewer multiple-view directional display devices have been given above, but there are many other applications. For example, they may be used in aeroplanes where each passenger is provided with their own individual in-flight entertainment programmes. Currently each passenger is provided with an individual display device, typically in the back of the seat in the row in front. Using a multiple-viewer multiple-view directional display could provide considerable savings in cost, space and weight since it would be possible for one display to serve two or more passengers while still allowing each passenger to select their own choice of film.

A further advantage of a multiple-viewer multiple-view directional display is the ability to preclude the users from seeing each other's views. This is desirable in applications requiring security such as banking or sales transactions, for example using an automatic teller machine (ATM), as well as in the above example of computer games.

Another known type of multiple view display is a three-dimensional (3D) display. In normal vision, the two eyes of a person perceive views of the world from different perspectives, owing to the different positions of the eyes within the head. These two perspectives are then used by the brain to assess the distance to the various objects in a scene. In order to build a display which will effectively display a three dimensional image, it is necessary to re-create this situation and supply a so-called "stereoscopic pair" of images, one image to each eye of the or each viewer.

Three dimensional displays are classified into two types depending on the method used to supply the different views to the eyes. A stereoscopic display typically displays both images of a stereoscopic image pair over a wide viewing area. Each of the views is encoded, for instance by colour, polarisation state, or time of display. The user is required to wear a filter system of glasses that separate the views and let each eye see only the view that is intended for it.

An autostereoscopic display displays a right-eye view and a left-eye view in different directions, so that each view is visible only from respective defined regions of space. The region of space in which an image is visible across the whole of the display active area is termed a "viewing window". If the viewer is situated such that their left eye is in the viewing window for the left eye view of a stereoscopic pair and their right eye is in the viewing window for the right-eye view of the pair, then a correct view will be seen by each eye of the observer and a three-dimensional image will be perceived. An autostereoscopic display requires no viewing aids to be worn by the viewer.

For a flat panel autostereoscopic display, the formation of the viewing windows is typically due to a combination of the picture element (or "pixel") structure of the image display unit of the autostereoscopic display and an optical element, generically termed a parallax optic. An example of a parallax optic is a parallax barrier, which is a screen with transmissive regions, often in the form of slits, separated by opaque regions. This screen can be disposed in front of or behind a spatial light modulator (SLM) having a two-dimensional array of picture elements to produce an autostereoscopic display.

FIG. 1 is a plan view of a conventional autostereoscopic display. The display 1 consists of a spatial light modulator (SLM) 4 that constitutes an image display device, and a parallax barrier 5. The SLM of FIG. 1 is in the form of a liquid crystal display (LCD) device having an active matrix thin film transistor (TFT) substrate 6, a counter-substrate 7, and a liquid crystal layer 8 disposed between the substrate and the counter substrate. The SLM is provided with addressing electrodes (not shown) which define a plurality of independently-addressable picture elements, and is also provided with alignment layers (not shown) for aligning the liquid crystal layer. Viewing angle enhancement films 9 and linear polarisers 10 are provided on the outer surface of each substrate 6, 7. Illumination 11 is supplied from a backlight (not shown).

The parallax barrier 5 comprises a substrate 12 with a parallax barrier aperture array 13 formed on its surface adjacent the SLM 4. The aperture array comprises vertically extending (that is, extending perpendicular to the plane of FIG. 1) transparent apertures 15 separated by opaque portions 14. An anti-reflection (AR) coating 16 is formed on the opposite surface of the parallax barrier substrate 12 (which forms the output surface of the display 1).

The pixels of the SLM 4 are arranged in rows and columns with the columns extending perpendicular to the plane of FIG. 1. The pixel pitch (the distance from the centre of one pixel to the centre of an adjacent pixel) in the row or horizontal direction is p. The width of the vertically-extending transmissive slits 15 of the aperture array 13 is 2w and the horizontal pitch of the transmissive slits 15 is b. The plane of the barrier aperture array 13 is spaced from the plane of the liquid crystal layer 8 by a distance s.

In use, the display device 1 forms a left-eye image and a right-eye image, and an observer who positions their head such that their left and right eyes are coincident with the left-eye viewing window 2 and the right-eye viewing window 3 respectively will see a three-dimensional image. The left and right viewing windows 2,3 are formed in a window plane 17 at the desired viewing distance from the display. The window plane is spaced from the plane of the aperture array 13 by a distance $r_o$. The windows 2,3 are contiguous in the window plane and have a pitch e corresponding to the average separation between the two eyes of a person. The half angle to the centre of each window 10, 11 from the normal axis to the display centre is $\alpha$.

The pitch of the slits 15 in the parallax barrier 5 is chosen to be close to an integer multiple of the pixel column pitch of the SLM 4 so that groups of columns of pixels are associated with a specific slit of the parallax barrier. FIG. 1 shows a display device in which two pixel columns of the SLM 4 are associated with each transmissive slit 15 of the parallax barrier.

FIG. 2 shows the angular zones of light created from an SLM 4 and parallax barrier 5, where the parallax barrier has a pitch of an exact integer multiple of the pixel column pitch. In this case, the angular zones coming from different locations across the display panel surface intermix and a pure zone of view for image 1 or image 2 (where 'image 1' and 'image 2' denote the two images displayed by the SLM 4) does not exist. In order to address this, the pitch of the parallax barrier is preferably reduced slightly so that it is slightly less than an integer multiple of the pixel column pitch. As a result, the angular zones converge at a pre-defined plane (the "window plane") in front of the display. This effect is illustrated in FIG. 3 of the accompanying drawings, which shows the image zones created by an SLM 4 and a modified parallax barrier 5'. The viewing regions, when created in this way, are roughly kite-shaped in plan view.

FIG. 4 is a plan view of another conventional autostereoscopic display device 1'. This corresponds generally to the display device 1 of FIG. 1, except that the parallax barrier 5 is placed behind the SLM 4, so that it is between the backlight and the SLM 4. This device may have the advantages that the parallax barrier is less visible to an observer, and that the pixels of the display appear to be closer to the front of the device. Furthermore, although FIGS. 1 and 4 each show a transmissive display device illuminated by a backlight, reflective devices that use ambient light (in bright conditions) are known. In the case of a transflective device, the rear parallax barrier of FIG. 4 will absorb none of the ambient lighting. This is an advantage if the display has a two dimensional (2D) or single view mode that uses reflected light.

In the display devices of FIGS. 1 and 4, a parallax barrier is used as the parallax optic. Other types of parallax optic are known. For example, lenticular lens arrays may be used to direct interlaced images in different directions, so as to form a stereoscopic image pair.

Holographic methods of image splitting are known, but in practice these methods suffer from viewing angle problems, pseudoscopic zones and a lack of easy control of the images.

Another type of parallax optic is a micropolariser display, which uses a polarised directional light source and patterned high precision micropolariser elements aligned with the pixels of the SLM. Such a display offers the potential for high window image quality, a compact device, and the ability to switch between a 2D display mode and a 3D display mode. The dominant requirement when using a micropolariser display as a parallax optic is the need to avoid parallax problems when the micropolariser elements are incorporated into the SLM.

Where a colour display is required, each pixel of the SLM 4 is generally given a filter associated with one of the three primary colours. By controlling groups of three pixels, each with a different colour filter, many visible colours may be produced. In an autostereoscopic display, each of the stereoscopic image "channels" must contain sufficient of the colour filters for a balanced colour output. Many SLMs have the colour filters arranged in vertical columns, owing to ease of manufacture, so that all the pixels in a given column have the same colour filter associated with them. If a parallax optic is disposed on such an SLM with three pixel columns associated with each slit or lenslet of the parallax optic, then, from each viewing region, pixels of one colour only can be seen. Care must be taken with the colour filter layout to avoid this situation. Further details of suitable colour filter layouts are given in EP-A-0 752 610.

Inventive Concept A

Description of Prior Art

The function of the parallax optic in a display device such as those shown in FIGS. 1 and 4 is to restrict light transmitted through the pixels of the SLM 4 to certain output angles. This restriction defines the angle of view of each of the pixel columns behind a given element of the parallax optic (such as for example a transmissive slit). The angular range of view of each pixel is determined by the pixel pitch p, the separation s between the plane of the pixels and the plane of the parallax optic, and the refractive index n of the material between the plane of the pixels and the plane of the parallax optic (which in the display of FIG. 1 is the substrate 7). H Yamamoto et al. show, in "Optimum parameters and viewing areas of stereoscopic full-colour LED displays using parallax barrier", IEICE Trans. Electron., vol. E83-C, No. 10, p 1632 (2000), that the angle of separation between images in an autostereoscopic display depends on the distance between the display pixels and the parallax barrier.

The half-angle $\alpha$ of FIG. 1 or 4 is given by:

$$\sin\alpha = n\sin\left(\arctan\left(\frac{p}{2s}\right)\right) \quad (1)$$

The angular separation between the two images is too low, in autostereoscopic displays of the type described above, to allow their use as multiple viewer multiple view displays. In principle, the angle $2\alpha$ between viewing windows may be increased by increasing the pixel pitch p, decreasing the separation between the parallax optic and the pixels s, or by increasing the refractive index of the substrate n.

In general, however, the pixel pitch is typically defined by the required resolution specification of the display device and therefore cannot be changed.

It is not always practical or cost effective significantly to change the refractive index of the substrates, which are normally made of glass.

Any attempt to increase the angular separation between the viewing windows by reducing the separation between the parallax optic and the plane of the pixels of the SLM would lead to difficulties as will be explained, by way of example, with respect to FIG. 5, which is a schematic block view of the display device 1 of FIG. 1 with an LCD as the SLM 4.

The LCD panel which forms the SLM 4 is made from two glass substrates. The substrate 6 carries TFT switching elements for addressing the pixels of the SLM, and is therefore known as a "TFT substrate". It will in general also carry other layers for, for example, aligning the liquid crystal layer 8 and allowing electrical switching of the liquid crystal layer. On the other substrate 7 (corresponding to the counter substrate of FIG. 1), colour filters 18 are formed, together with other layers for, for example, aligning the liquid crystal layer. The counter substrate 7 is therefore generally known as a "colour filter substrate" or CF substrate. The LCD panel is formed by placing the colour filter substrate opposite the TFT substrate, and sandwiching the liquid crystal layer 8 between the two substrates. In previous autostereoscopic displays, the parallax optic has been adhered to the completed LCD panel as shown in FIG. 5. The distance between the LCD pixels and the parallax optic is determined primarily by the thickness of the CF substrate of the LCD. Reducing the thickness of the CF substrate will reduce the distance between the LCD pixels and the parallax optic, but will make the substrate correspondingly weaker. A realistic minimum for CF substrate thickness is about 0.5 mm, but the pixel-to-parallax optic separation would still be too large for multiple viewer applications, even if a parallax optic were adhered directly to a substrate of this thickness.

U.S. Pat. No. 5,850,269 discloses another 3D autostereoscopic display which uses a lenticular lens array as the parallax optic. This arrangement is specifically concerned with preventing undesirable colour artefacts from occurring.

Autostereoscopic displays having pixels which are elongate in the horizontal direction are known and examples of such displays are disclosed in GB 2 396 070, GB 2 403 367, GB 2,317 734, GB 2 278,223, GB 2 315 902, GB 2 311 905 and GB 2 403 863. However, the use of horizontally elongate pixels in these documents is either arbitrary or serves some purpose unrelated to viewing window separation. Such displays provide two or more viewing windows which are close together, generally with centres which are spaced apart by approximately the typical interocular separation. Such displays are unsuitable for multiple viewer use because, for example, of the relatively small separation between adjacent viewing windows.

In this context, the "horizontal direction" refers to the direction on the display which the horizontal direction of an image would have when displayed normally with its designed or "intended" orientation on the display. The horizontal direction is parallel or nearly parallel to the direction of eye separation of a viewer who is viewing the display with the normal or intended relative position and orientation. The horizontal direction is also generally parallel or nearly parallel to the direction of separation of viewing windows.

WO 2004/088996 discloses a dual viewer dual view display based on time multiplexing of image display and a switched directional backlight. Images for viewing by first and second viewers are displayed alternately by the whole of a transmissive LCD. The backlight is disposed behind the LCD and is switched in synchronism with the displayed images to direct light through the LCD alternately towards the first and second viewers. In order to provide acceptable display performance, the LCD must be capable of switching at a sufficiently high rate to avoid perceptible image flicker by the viewers. This requires the use of a relatively expensive LCD. Also, because of light leakage within the relatively complex backlight, crosstalk performance is relatively poor. Poor crosstalk performance leads to the disadvantages described hereinafter.

FIG. 6 of the accompanying drawings illustrates a known type of line-by-line scanning arrangement used in LCDs. The LCD comprises rows and columns of pixels with a single row being illustrated in FIG. 6. The SLM also comprises data lines such as 80 extending in the vertical or column direction and scan lines such as 81 extending in the horizontal or row direction. The data lines 80 are connected to a data driver located along the top of the array of pixels whereas the scan lines 81 are connected to a scan line driver located along the left side of the pixel array.

Each pixel has a data input such as 82 connected to an adjacent data line 80 and a scan input 83 connected to an adjacent scan line 81. The display may, for example, be of the active matrix thin film transistor type.

The display is refreshed with image data row by row. In particular, image data for a row of pixels is clocked into the data line driver in series from an image-generating source. When this has been completed, the scan line driver supplies a scan pulse to the scan line 81 which is common to the row of pixels to be refreshed. The fresh image data are thus clocked into the row of pixels. This process is then repeated for each row in turn until all of the rows of pixels have been refreshed. The process then starts again, typically from the uppermost row of pixels and is repeated for as long as the display is in use. An arrow 84 illustrates the order in which pixel data are supplied to the data line driver.

Such a scanning arrangement is typical of displays used for all purposes, including multiple viewer multiple view displays. The arrangements for driving displays which are refreshed in this way are therefore relatively standardised, with the scan pulse frequency and the frame refresh rate having standard values. Thus, arrangements for supplying data are made to be compatible with these frequencies.

Most spatial light modulators, such as LCDs, are designed to be refreshed row-by-row in this way and have pixels which are elongate in the vertical or "column" direction. If such devices were rotated by 90° about a normal to the display surface, the pixels would then be elongate in the horizontal direction. However, unless such devices were modified to change the locations of the scan line and data line devices, such an arrangement would require column-by-column refreshing, which is completely incompatible with standard scanning techniques. Even if the locations of the scan line and data line drivers were changed by redesigning the device to permit row-by-row refreshing, the vertical (or frame) and horizontal (or line) frequencies would be incompatible with standard scanning techniques. Thus, standard scanning methods and apparatuses could not be used with such hypothetical arrangements.

Inventive Concept B

Description of Prior Art

GB 2 278 223 discloses an autostereoscopic 3D display comprising a spatial light modulator cooperating with a parallax optic illustrated as a lenticular screen. In FIG. 12 of GB 2 278 223, the modulator comprises pairs of adjacent columns of pixels displaying vertical strips of left eye and right eye images. Each pair of columns cooperates with an associated lenticule of the lenticular screen so that the left and right eye images are visible in adjacent viewing windows whose centres are spaced apart by the typical separation between the eyes of a person. The pixel apertures are defined by a black mask and are arranged in horizontal rows so that the width of the black mask portions between pixel apertures of different groups is greater than the width between apertures of the same group.

U.S. Pat. No. 4,829,365 discloses an autostereoscopic 3D display in which a spatial light modular cooperates with a backlight arrangement in the form of vertical light emitting lines to define left and right eye viewing windows. FIG. 14 of U.S. Pat. No. 4,829,365 illustrates a black mask on the front of the modulator defining rows of pixel apertures. Portions of the black mask between horizontally adjacent pixels are all of the same width.

Such known arrangements are unsuitable for multiple viewer multiple view displays. For example, the viewing windows are too small and too close together to allow different viewers to see different views.

Inventive Concept C

Description of Prior Art

EP 0953962 discloses a technique for providing correction for crosstalk so as to reduce its visibility. Such a technique is effective for autostereoscopic 3D displays but may not be sufficient for multiple view displays where the different images are viewed by different observers.

EP 0822441 discloses an autostereoscopic 3D display using a parallax barrier as the parallax optic and, in particular, discloses a technique for reducing the crosstalk caused by diffraction. For example, pixels having "soft" edges are disclosed in order to reduce diffraction and hence crosstalk.

GB 2 336 963 discloses an autostereoscopic 3D display and controller for reducing optical crosstalk between images visible in viewing windows for the eyes of a viewer. Such optical crosstalk results from optical effects such as scattering and diffraction in optical elements of the display. The controller adds, to the image data for each pixel, a grey level proportional to the RGB colour vector for that pixel and then substracts a correction value. The correction value is proportional to the RGB colour vector for a pixel displaying a different image. The gamma correction for the display device may be taken into account when determining the correction value.

Although such known techniques for reducing crosstalk between views may be sufficient for autostereoscopic 3D displays, they may not be sufficient for multiple viewer multiple view displays. In general, multiple viewer multiple view displays must be capable of very low crosstalk between views intended for different viewers if such displays are to be useful. For example, where such a display is used in an application where each viewer should not, or must not, see any view intended for a different viewer, crosstalk must be sufficiently low to achieve this. If the amount of crosstalk is too high, then this may result in a viewer being able, in at least some circumstances, to see an image not intended for that viewer.

DISCLOSURE OF INVENTION

Inventive Concept A

Summary

According to a first aspect of the invention, there is provided a multiple view display comprising: a spatial light modulator comprising a plurality of pixels arranged to display a plurality of spatially interlaced images, the pixels being elongate substantially in the horizontal direction of the designed image orientation on the display; and a parallax optic cooperating with the modulator substantially to restrict light from the modulator modulated by the different images to respective different directions, characterised in that the display is a multiple viewer display and the parallax optic cooperates with the modulator such that the spatially interlaced images are visible for viewing by respective different viewers in the respective different directions with respect to the display.

The display may comprise a horizontally striped colour filter.

The pixels may be rectangular with major axes extending substantially in the horizontal direction.

The pixels may be spaced apart horizontally with a constant horizontal pitch and may have a horizontal aperture between 40% and 90% of the horizontal pitch. The horizontal aperture may be substantially equal to 70% of the horizontal pitch.

The pixels may have a vertical aperture substantially equal to one third of the horizontal aperture thereof.

The parallax optic may comprise a parallax barrier comprising a plurality of slits oriented in a vertical direction of the designed image orientation on the display.

The horizontal width of the slits may be substantially equal to the horizontal pixel aperture. As an alternative, the horizontal width of the slits may be substantially equal to the horizontal pixel aperture. As a further alternative, the parallax barrier may be disablable to provide a single view mode of operation and the horizontal width of the slits may be less than the horizontal pixel aperture.

The parallax barrier may be disablable to provide a single view mode of operation and the horizontal width of the slits may be less than the horizontal pixel aperture.

A respective lens may be disposed at each slit. The lenses may be converging lenses, such as cylindrically converging lenses. Such an arrangement permits the use of wider slits so as to provide a brighter display. Also, the transitions between images and hence viewing windows may be made sharper, for example reducing image crosstalk.

The pixels may be arranged as rows extending in the horizontal direction and columns extending in a vertical direction of the designed image orientation on the display. The rows may be arranged as groups of N adjacent rows, where N is an integer greater than one, the pixels of each group having scan inputs connected to a common scan line for the group and data inputs connected to respective data lines which are common to all of the groups.

Such an arrangement allows the scanning in of image data and the refreshing of the display at rates which are the same as or similar to known types of display. Thus, such an arrangement is compatible with known or standard image source arrangements and scanning techniques while permitting the use of wide pixels to provide a multiple viewer display with sufficiently widely spaced viewing windows.

In each group, the data inputs of pixels which are in a same one of the columns and which are adjacent each other may be connected to adjacent ones of the data lines.

N may be equal to three.

Inventive Concept B

Summary

According to a second aspect of the invention, there is provided a multiple view display comprising: a spatial light modulator comprising a plurality of pixels arranged to display a plurality of spatially interlaced images for viewing by respective different viewers in respective different directions with respect to the display; and a parallax optic cooperating with the modulator substantially to restrict light from the modulator modulated by the different images to the respective different directions, the modulator further comprising a black mask defining pixel apertures of the pixels and having portions between pixel apertures, which are horizontally adjacent in the horizontal direction of the designed image orientation on the display, which portions are of at least two different widths, the parallax optic comprising a plurality of parallax elements, each of which cooperates with a respective group of pixels, characterised in that the display is a multiple viewer display and in that the width of each portion of the black mask between pixels of the same group is greater than the width of each portion of the black mask between pixels of different groups.

The width of each portion of the black mask between pixels of the same group may be between substantially 32% and substantially 48% of the horizontal pixel pitch.

The width of each portion of the black mask between pixels of different groups may be between substantially 16% and substantially 24% of the horizontal pixel pitch.

The parallax optic may comprise a parallax barrier comprising a plurality of slits oriented in a vertical direction of the designed image orientation on the display. The horizontal width of the slits may be substantially equal to the horizontal pixel aperture.

It is thus possible to provide a display which allows different views to be viewed by different viewers. Multiple viewer displays are required to provide viewing windows or regions which are spaced sufficiently far apart to allow different viewers to be able to see the different views. The relatively wide black mask portions between horizontally adjacent pixels of the same group allow such separation to be achieved and reduce the angular viewing range or ranges within which image mixing occurs. This allows a multiple viewer display of improved performance to be achieved.

The display may comprise a controller for supplying to the modulator pixel data in a form suitable for interlacing the images.

The modulator may comprise a light valve, such as a liquid crystal device.

The plurality of images may comprise two images.

Inventive Concept C

Summary

According to a third aspect of the invention, there is provided a display controller for supplying data for displaying a plurality of images to a multiple viewer multiple view display, characterised in that the controller comprises a processor arranged to add to a pixel value of each pixel of each image to be displayed a predetermined grey level to form a sum and to subtract from each sum an optical crosstalk correction value which is a function of: the value of at least one other pixel of another of the images to be displayed; and a mapping relating pixel intensity to grey level for the display.

As described above, crosstalk between views of a multiple viewer multiple view display is undesirable as this can result in a viewer seeing a "ghost image" of an image intended for a different viewer. This is particularly undesirable where it is a specific requirement that each viewer must not be able to see am image intended for another viewer. The present technique provides an arrangement which is capable of reducing such crosstalk to a sufficiently low level such that the images intended for specific viewers cannot be perceived by other viewers. This allows, for example, security requirements and legal requirements to be met with a single display device displaying images for two or more viewers.

The predetermined grey level may be the same for all pixels. Such an arrangement simplifies the calculations required to reduce crosstalk as it is necessary to calculate only a single grey level to be added to all pixels. It is even possible, for some applications, for the single grey level to be predetermined and preset during manufacture of the display controller, thus further reducing the workload on the controller. The predetermined grey level may represent a maximum possible crosstalk contribution.

The at least one other pixel may comprise one other pixel. The other pixel may be of a same colour.

The crosstalk correction value may also be a function of the pixel value to be corrected.

According to a fourth aspect of the invention, there is provided a display controller for supplying data for displaying a plurality of images to a multiple viewer multiple view display, characterised in that the controller comprises a processor arranged to add to each pixel value of at least some pixels, of the display an electrical crosstalk correction value which is a function of electrical crosstalk within the display.

A previously unknown mechanism for generating crosstalk in a multiple viewer multiple view display has been discovered. This mechanism concerns electrical crosstalk which occurs mainly or exclusively within a display device. For example, parasitic capacitance between data lines in a display device may give rise to image crosstalk such that a viewer may be able to see a "ghost image" of an image intended for another viewer. It has further been found that it is possible to provide compensation for such crosstalk so as to reduce it to a level which is imperceptible to the viewers.

The function may comprise a function of the pixel value to be corrected and the value of at least one other pixel. The at least one other pixel may comprise an adjacent pixel. It has been surprisingly found that, in many applications, it is sufficient, when compensating each pixel value, to take into account only one other pixel value. This simplifies the calculations required in order to reduce the visible effects of electrical crosstalk.

The function may further comprise a function of a mapping relating pixel intensity to grey level for the display.

According to a fifth aspect of the invention, there is provided a display controller for supplying data for displaying a plurality of images to a multiple viewer multiple view display, characterised in that the controller comprises a processor arranged to add to at least one of the images a masking image for masking crosstalk between images.

It has been surprisingly found that the visibility of crosstalk, for example in the form of "ghost images", can be reduced or eliminated by adding a masking image. Such masking images can be provided by relatively simple means and with little or no penalty in terms of cost and complication.

The processor may be arranged to add the same masking image to each of the images.

The masking image may comprise noise. As an alternative, the masking image may comprise random text.

The masking image may be a static image. As an alternative, the masking image may be a changing image.

The masking image may comprise a grey level.

The processor may be arranged to add the grey level when the at least one image is substantially black.

The masking image may have a maximum brightness substantially equal to 5% of the maximum display brightness.

The masking image may have a maximum brightness equal to or greater than 10 times the maximum expected crosstalk brightness.

The plurality of images may comprise two images.

A controller according to any of the third to fifth aspects of the invention may be combined with a display according to the first or second aspect of the invention.

BRIEF DESCRIPTION OF DRAWINGS

The invention will be further described, by way of example, with reference to the accompanying drawings, in which.

BEST MODE FOR CARRYING OUT THE INVENTION

Figure 7:
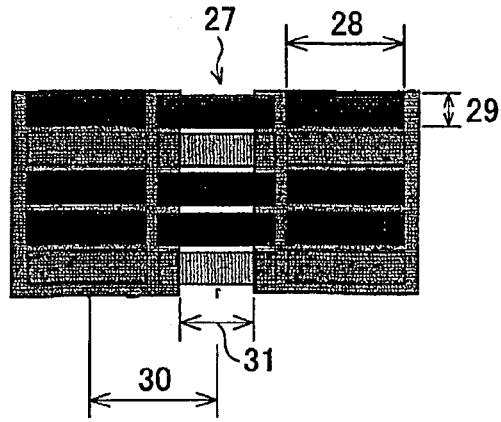
FIGS. 7 and 8 show diagrammatic front and cross-sectional views, respectively, of a multiple view display constituting an embodiment of the invention.
Figure 8:
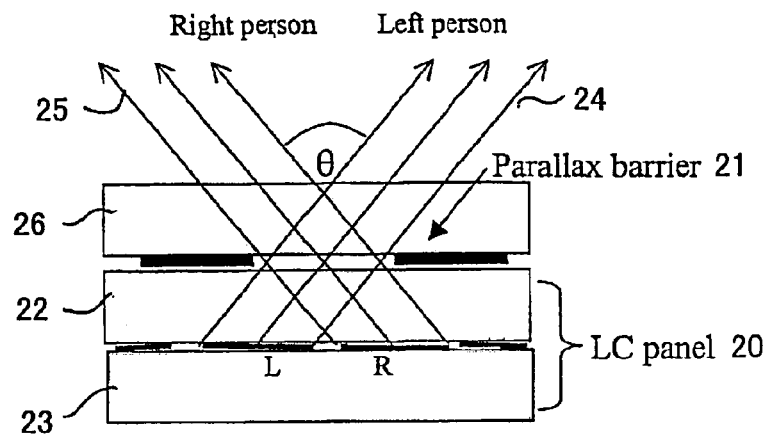

FIGS. 7 and 8 illustrate diagrammatically front and cross-sectional views of a multiple viewer multiple view display for simultaneously displaying left and right images so that these can only be seen by viewers from directions to the left and right of the normal to the display. The display comprises a spatial light modulator in the form of a transmissive liquid crystal (LC) panel 20 with a backlight (not shown) and a front parallax barrier 21. The LC panel 20 comprises substrates 22 and 23 between which are formed pixels L and R for displaying spatially multiplexed or interlaced left and right views for viewing in the directions indicated by the arrows 24 and 25, respectively. The angle between the viewing directions is indicated at θ. The parallax barrier 21 is formed on a substrate 26 so that the pixel plane of the panel 20 is disposed between the substrates 22 and 23 and the barrier plane is disposed between the substrates 22 and 26.

As shown in the front view in FIG. 7, the pixels are arranged as rows and columns with adjacent columns of pixels displaying interlaced vertical strips of the two images to be displayed. Each pair of columns of pixels cooperates with a respective slit 27 of the barrier 21, which substantially restricts the light modulated by the pixel columns so that the correct images are seen by each viewer whereas the incorrect image is not substantially visible to each viewer.

Each of the pixels is rectangular with its major axis extending horizontally when referred to the intended or designed orientation of images displayed by the pixels of the panel 20. Each pixel has a horizontal aperture 28 which is substantially three times the vertical aperture 29 thereof. In this respect, the horizontal and vertical apertures are defined as the maximum width and the maximum height of the pixel in the horizontal and vertical directions, respectively. The pixels are arranged as a regular rectangular array with a horizontal pitch 30 such that the horizontal aperture 28 is between 40% and 90% of the horizontal pitch 30. In a preferred embodiment, the horizontal aperture 28 is 70% of the horizontal pixel pitch in order to give a good compromise between brightness and viewer freedom of movement while producing relatively low levels of crosstalk between images from diffraction and scattering within the display.

The width 31 of each slit 27 of the barrier 21 may be substantially equal to the horizontal aperture of the pixels in order to provide good brightness of display. For improved, i.e. lower, crosstalk, the slit width 31 may be made wider and the pixel horizontal aperture may be made smaller.

In embodiments where the parallax barrier 21 can be disabled so as to provide a single view mode of operation, higher brightness may be achieved by making the pixel horizontal aperture 28 larger than the slit width 31.

As indicated by the shading in the front view of FIG. 7, the display includes a horizontally striped colour filter so that the pixels are arranged as rows with pixels of each row being of the same colour and with red, green and blue rows repeating cyclically in the vertical direction. A composite colour pixel is formed by triplets of vertically arranged red, green and blue pixels.

The use of horizontally elongate pixels allows a directional display of the parallax optic type to be used as a multiple viewer multiple view display. The "wider" pixels allow more widely spaced viewing windows, suitable for multiple viewers, to be generated with a practical spacing between the LC pixel plane and the parallax element plane (the plane containing the barrier slits in the embodiment shown in FIG. 8). The substrate which mainly defines this spacing may therefore be made of a material of sufficiently large thickness to be acceptably robust and to avoid the need for special handling of fragile elements during manufacture and use. For example, glass substrates of at least 0.5 mm thickness may be used having normal refractive indices. It is not, therefore, necessary to use more "exotic" materials of relatively high refractive index.

Figure 1:
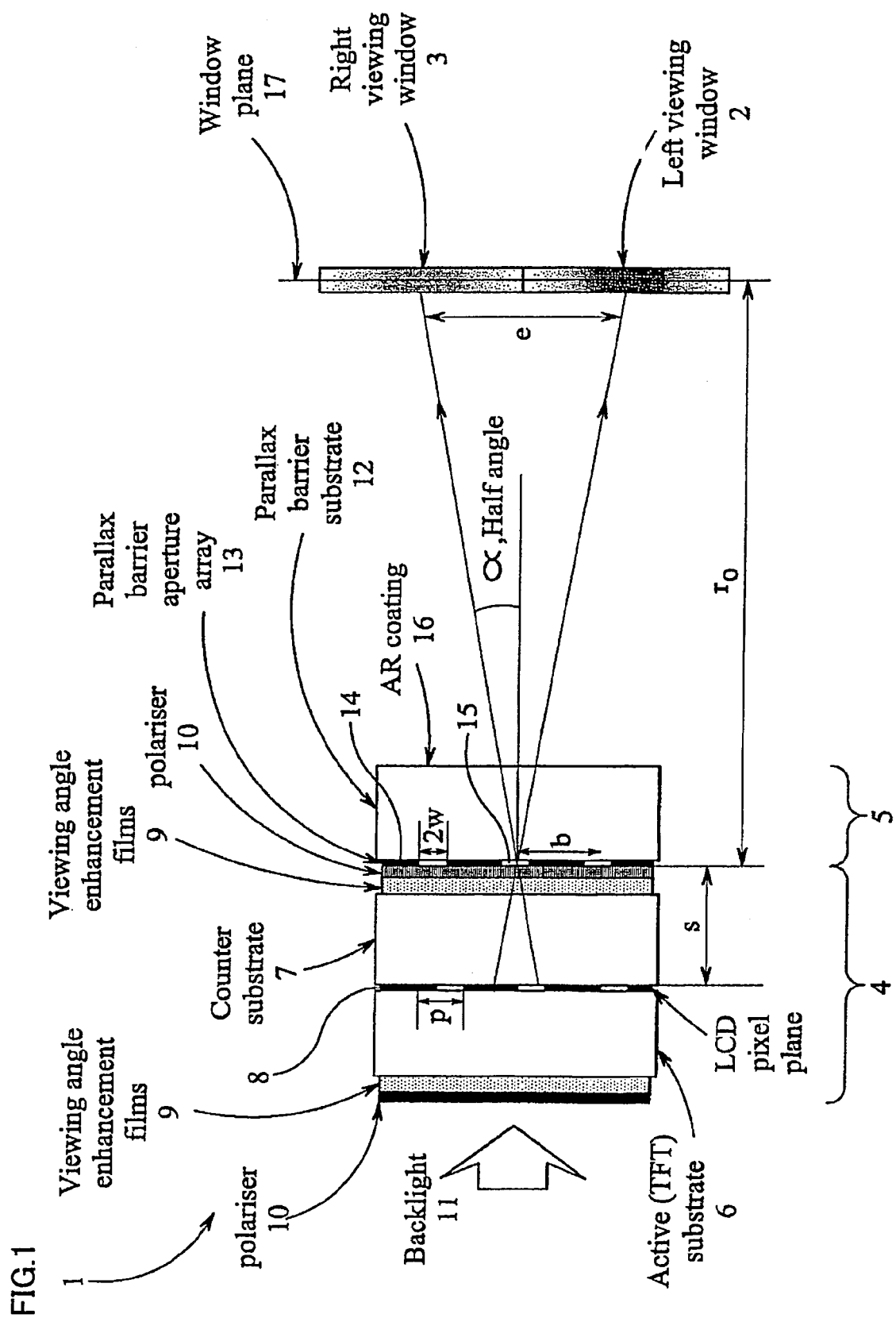
FIG. 1 is a schematic plan view of a conventional autostereoscopic display device.
Figure 2:
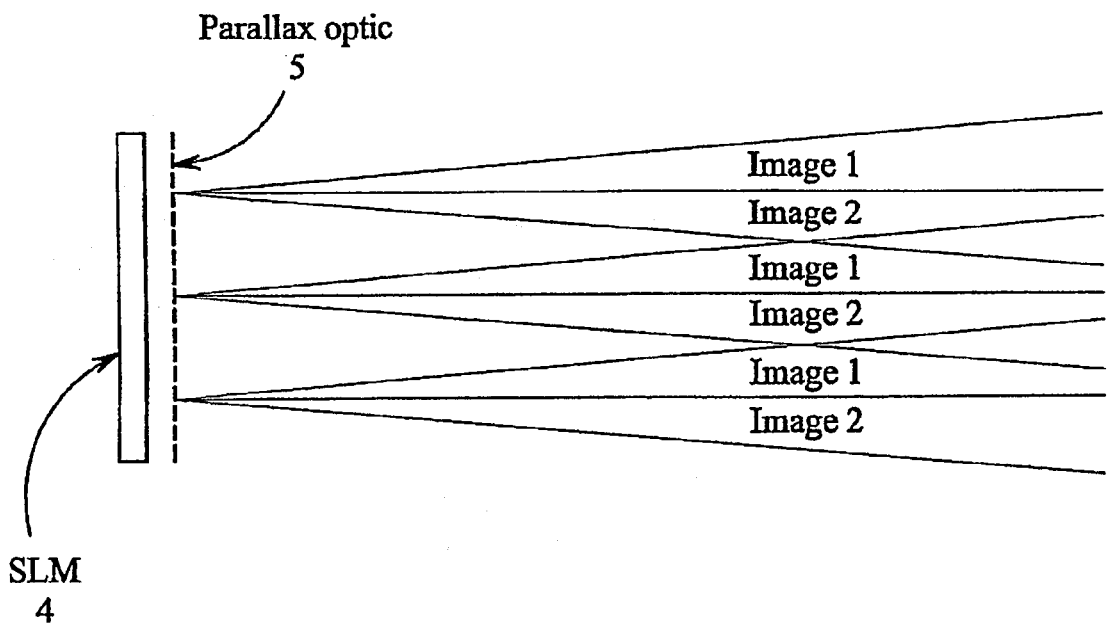
FIG. 2 is a schematic illustration of viewing windows provided by a conventional multiple view display device.
Figure 3:
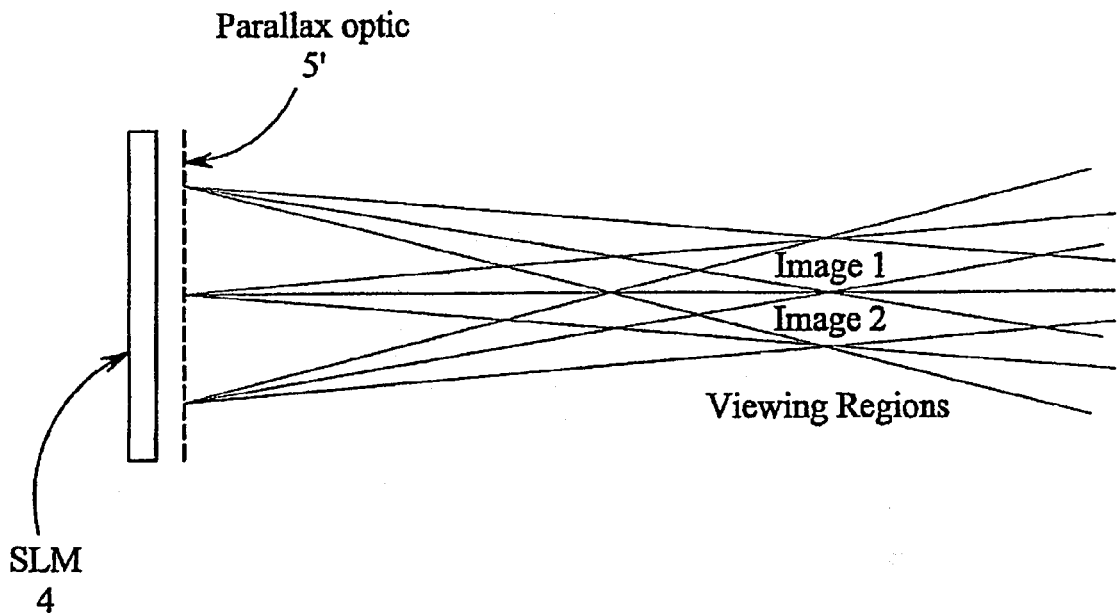
FIG. 3 is a schematic plan view of viewing windows produced by another conventional multiple view directional display device.
Figure 4:
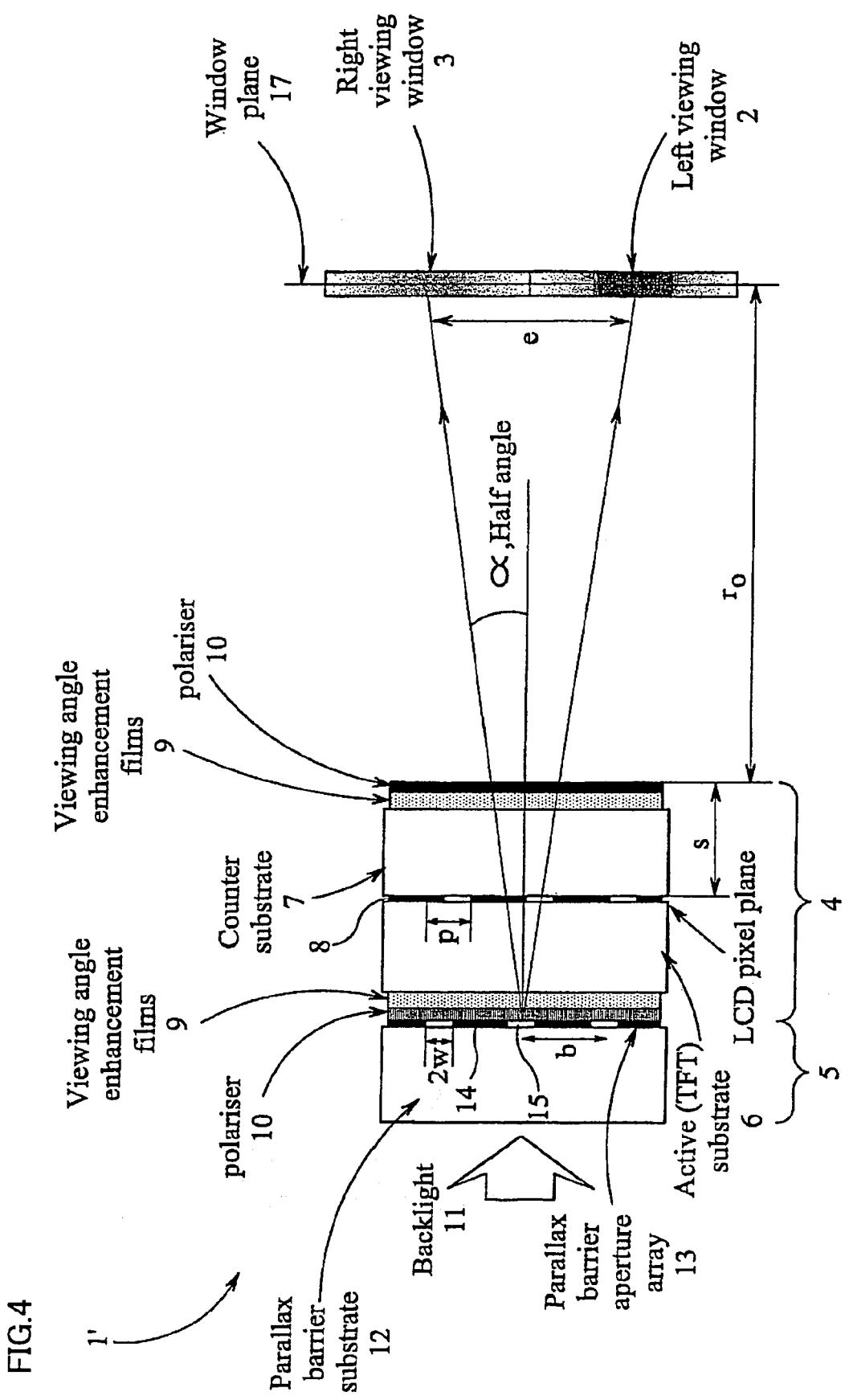
FIG. 4 is a schematic plan view of another conventional autostereoscopic display device.
Figure 5:
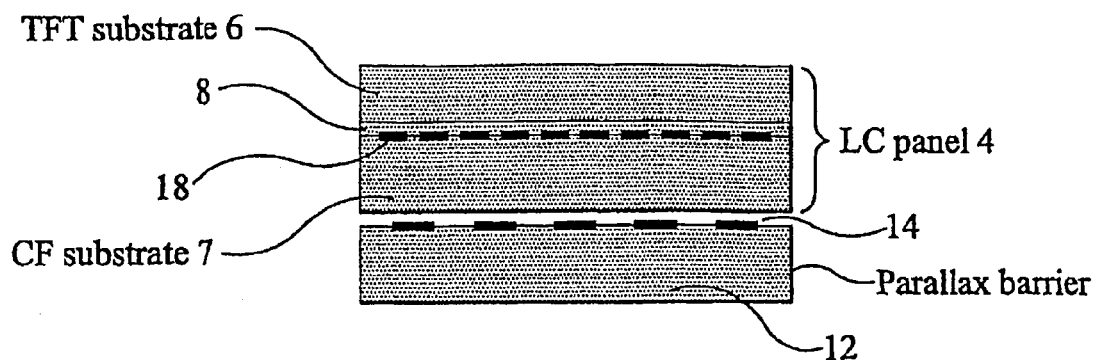
FIG. 5 is a schematic plan view showing the principal components of a conventional multiple view directional display device.
Figure 6:
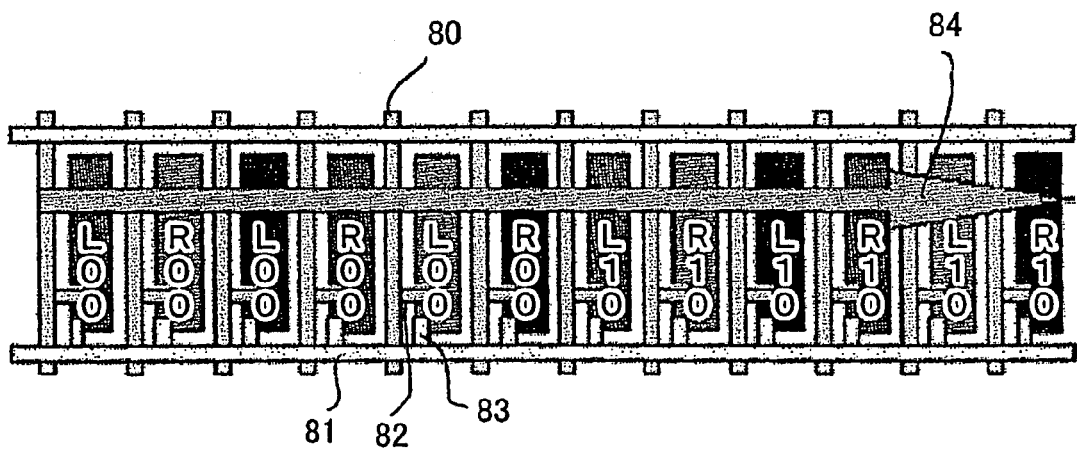
FIG. 6 is a schematic front view of part of a spatial light modulator illustrating a conventional scanning arrangement.
Figure 9:
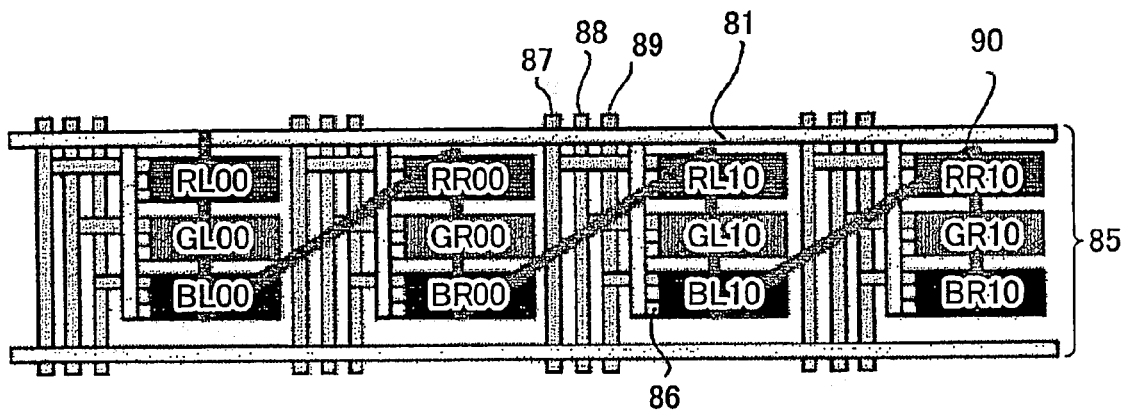
FIG. 9 is a schematic front view of part of a spatial light modulator of the display of FIGS. 7 and 8 illustrating a scanning arrangement.

Because of the different aspect ratio of the pixels of this display, the number of pixels in each row and the number of rows of pixels of the display are different from those of conventional LC panels, for example as illustrated in FIG. 6. In the example illustrated in FIG. 9, the horizontal pixel apertures are approximately three times the size of the horizontal picture apertures of the panel of FIG. 6, whereas the vertical pixel apertures in FIG. 9 are approximately one third of the size of the vertical pixel apertures in FIG. 6. Thus, there is approximately one third of the number of pixels in each row of FIG. 9 as compared with FIG. 6. Also, there are approximately three times as many rows in FIG. 9 as in FIG. 6.

It would be possible to refresh the panel of FIG. 9 a row at a time as in the panel of FIG. 6. However, this would require a scan pulse frequency approximately three times that required for the panel of FIG. 6. Also, the number of pixels being refreshed in each row would be approximately one third. Scanning to achieve this would be substantially different from the conventional scanning as described hereinbefore with reference to FIG. 6 and would be incompatible with existing image data sources for supplying pixel data for display.

FIG. 9 illustrates an arrangement which substantially overcomes this incompatibility. The pixels are arranged as groups of, in this case three, rows 85. Within each group 85 of rows, the pixels are arranged as columns of three pixels. All of the pixels of the group 85 have scan inputs such as 86 connected to a common scan line 81. The pixels have data inputs connected to respective data lines so that the data inputs of the pixels in each column of three in the group 85 are connected to adjacent respective data lines such as 87 to 89. The connections are such that the data inputs of adjacent pixels in each column are connected to adjacent data lines.

This allows a substantially conventional scanning arrangement to be used to refresh the panel. Pixel data for each group 85 of rows of pixels are clocked into the data line driver in the order indicated by the zig-zag arrow 90. When the data for all of the pixels of the group 85 have been entered, the scan line 81 for the group 85 receives a scan pulse from the scan line driver to refresh all of the pixels of the group 85 simultaneously. Thus, three rows at a time are refreshed. This process is then repeated for each group of three rows in turn. As a result of this arrangement, the entering of pixel data and the scanning of groups of lines occur in a way which is compatible with known types of displays, for example as illustrated in FIG. 6, so that this arrangement is compatible with existing and standard image data sources. Although the pixel data requires some reordering in order to enter the data for three rows, this can easily be achieved within conventional image data sources and does not lead to any incompatibility.

Figure 10:
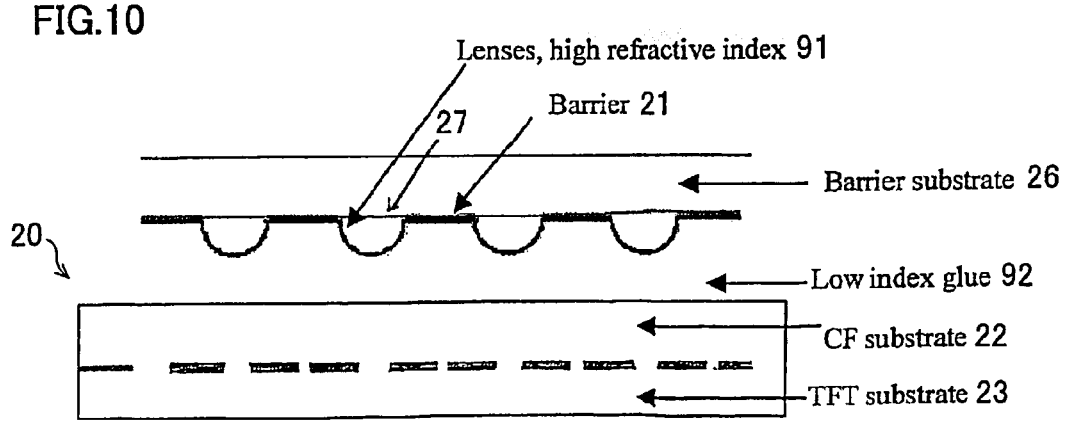
FIG. 10 is a diagrammatic cross-sectional view of a multiple view display constituting an embodiment of the invention.

FIG. 10 illustrates a multiple view display of a type similar to that illustrated in FIG. 8. However, the display of FIG. 10 differs in that the barrier substrate 26 is spaced from the substrate 22 to accommodate an array of lenses such as 91 made of a high refractive index material. The lenses comprise cylindrically converging lenses or lenticules with each lens being disposed at a slit 27 of the barrier 21. The lenses 91 are cylindrical and plano-convex with the plane surfaces coinciding with the slits 27 and the convex surfaces extending towards the panel 20. The barrier 21 with the lenses 91 is attached to the substrate 22 of the panel 20 by means of a low refractive index glue layer 92.

The multiple viewer display of FIG. 10 operates in essentially the same way as the display of FIG. 8. However, the use of the cylindrically converging lenses 91 at the barrier slits 27 allows the use of wider barrier slits 27 and this provides brighter images for a given amount of illumination of the display. Also, the lenses 91 make the transition between images and between viewing windows sharper, for example resulting in lower crosstalk between images.

Figure 11:
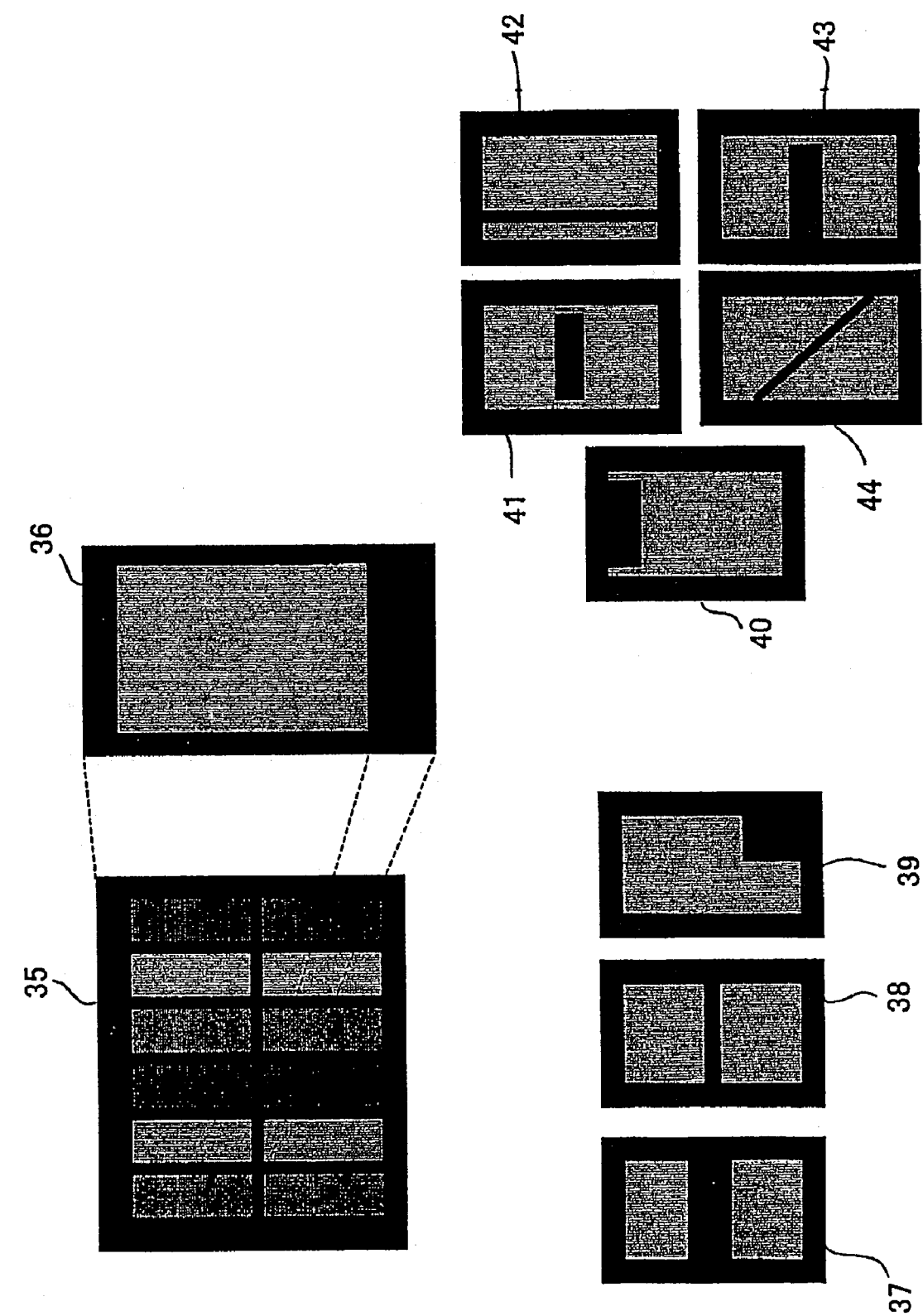
FIG. 11 is a diagram illustrating desirable and undesirable pixel aperture shapes.

FIG. 11 illustrates another type of LC panel in which the pixels are elongate and extend in the vertical direction of the designed image orientation on the display. An example of part of a panel is shown at 35 and the "ideal" rectangular pixel shape is shown at 36. Such a pixel shape 36 has no features in the horizontal direction of small width so that the greater crosstalk which would be produced by horizontal diffraction from such smaller features is absent.

FIG. 11 illustrates three other pixel shapes at 37, 38 and 39. The shapes shown at 37 and 38 have constant width and are made up of two separate rectangular sub-apertures so that there are no "thin" features to contribute to horizontal diffraction. The shape shown at 39 comprises two sub-apertures of rectangular shape contiguous with each other such that the minimum width of any part of the pixel is not less than half the horizontal aperture of the pixel. Such a pixel shape again provides relatively low horizontal diffraction. FIG. 11 also illustrates pixel shapes at 40 to 44, all of which have relatively thin vertical lines or regions which produce relatively high horizontal diffraction. Shapes of this type are therefore to be avoided in order to reduce horizontal diffraction and hence avoid unnecessary crosstalk.

Figure 12:
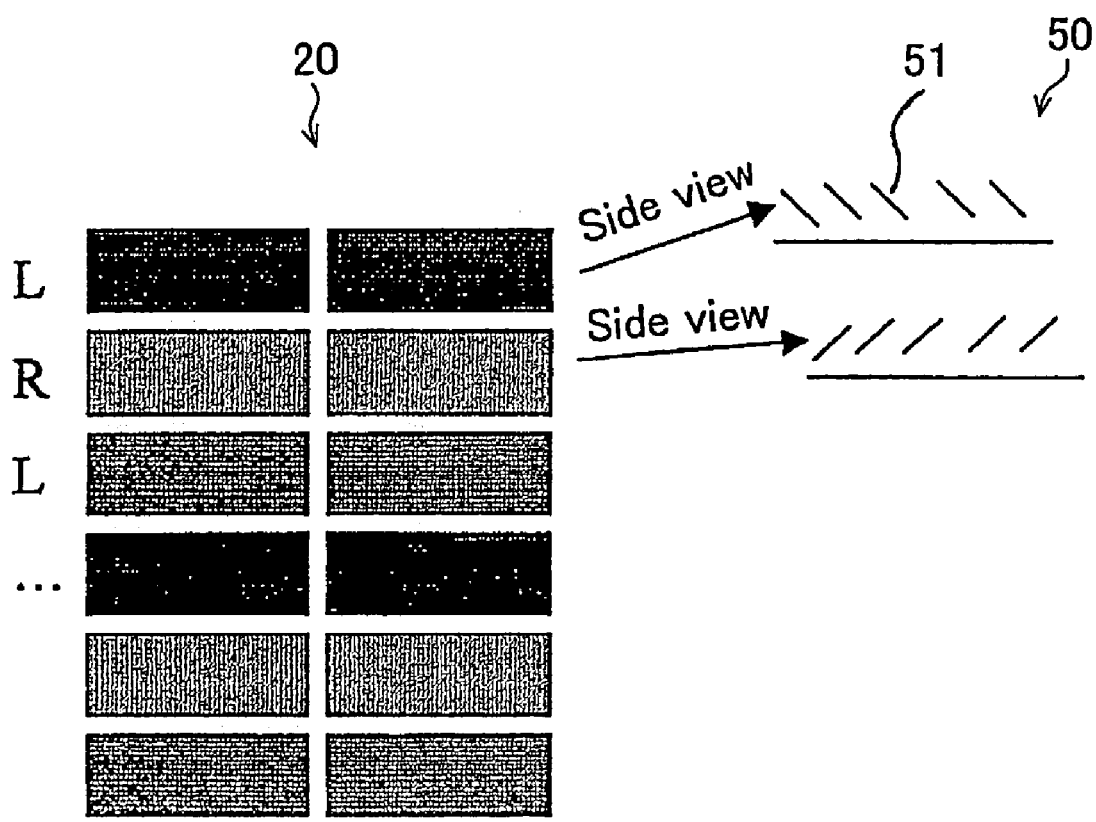
FIG. 12 is a diagram illustrating a multiple view display constituting an embodiment of the invention.

FIG. 12 illustrates diagrammatically a liquid crystal panel 20 cooperating with a parallax optic 50 to form a multiple view display of a type similar to that shown in FIGS. 7 to 9 but with some modifications. The pixels of the panel 20 are arranged in much the same way as shown in FIGS. 7 to 9 but are allocated differently to the left and right views. In particular, each row (rather than each column) of pixels displays a horizontal slice or strip of one of the images to be displayed with the rows displaying left and right strips alternating with each other vertically. The panel 20 includes a colour filter also of the type illustrated in FIG. 7 with horizontal stripes of red, green and blue repeating cyclically. FIG. 12 shows adjacent rows of pixels displaying different views but the pixels may be arranged as adjacent sets of rows with each set comprising more than one row and displaying a horizontal strip of one of the views.

The parallax optic 50 in the display of FIG. 12 is of a microlouvre type and comprises rows of microlouvres, each row of which overlays and cooperates with a respective row (or set of rows) of the pixels of the panel 20. The microlouvres resemble miniature Venetian blinds with the louvres being oriented in the same direction in each row and with the louvres in adjacent rows being oriented in different directions so as substantially to restrict the transmission of light from the panel 20 in the correct direction towards the left or right viewer. The viewing directions are thus parallel to the planes of the individual louvres, such as 51. Microlouvre arrangements of this type are known and will not be described further.

FIG. 12 thus illustrates another embodiment of a multiple viewer multiple view display of the parallax optic type using horizontally elongate pixels. In this embodiment, the viewing window spacing is largely determined by the directions of the microlouvres. Good crosstalk performance is achieved for relatively limited vertical movement of a viewer so that such a display is particularly useful for applications where vertical freedom of movement from the intended viewing position is not required.

As a possible alternative, the parallax optic 50 shown in FIG. 12 may be replaced by a holographic element performing substantially the same function. In fact, the parallax optics in the previously described embodiments may also be replaced by holographic elements.

Figure 13:
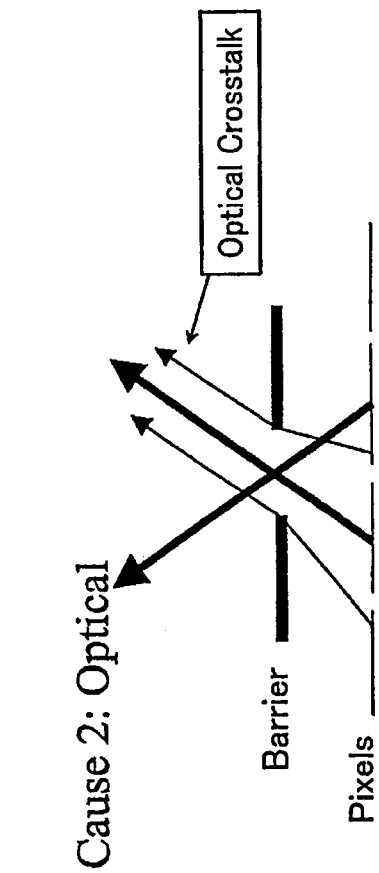
FIG. 13 is a diagram illustrating causes of crosstalk in a multiple view display.
Figure 13:
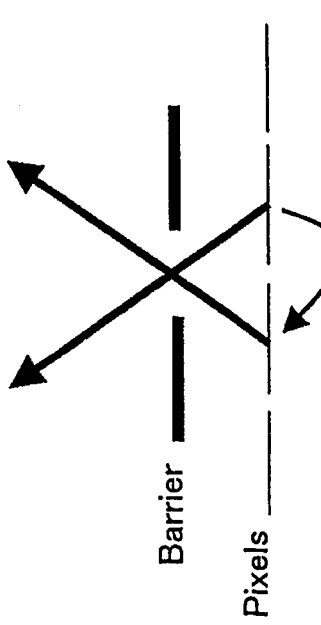

FIG. 13 illustrates two causes of crosstalk between images at viewing locations in multiple view displays. Cause 1 shown at the left of FIG. 13 results from electrical crosstalk, which is a small effect which may occur between pixels of an LC panel. This may arise, for example, because of parasitic capacitance in the thin film transistors (TFT's) of driver circuitry of the panel. The behaviour of electrical crosstalk is relatively complex. For example, electrical crosstalk may occur in only one "direction" so that crosstalk from one pixel might only affect a pixel to one side (to the left as shown in FIG. 13). Also, the magnitude of electrical crosstalk may depend on the data value supplied to the affected pixel and on the data value supplied to the pixel causing crosstalk.

Cause 2 illustrated at the right in FIG. 13 results from optical crosstalk. This can result from imperfections in the optical elements of the display but can also arise from intrinsic causes such as diffraction and scattering at a parallax barrier. A known technique for correcting for optical crosstalk is disclosed in EP 0953962, the contents of which are incorporated herein by reference. This technique is described in the context of autostereoscopic 3D displays. However, multiple viewer multiple view displays require very low levels of crosstalk, preferably lower than in autostereoscopic displays, and it is possible to improve the correction for optical crosstalk as described hereinafter.

Electrical crosstalk resulting in crosstalk between different images is a previously undiscovered crosstalk mechanism which can degrade performance of multiple viewer multiple view displays to an unacceptable level. The electrical mechanism which generates such electrical crosstalk is different from the mechanisms which generate optical crosstalk, so that techniques for reducing optical crosstalk may not be sufficient alone to reduce crosstalk between views to an acceptable level. Different corrections are required to reduce or "correct" electrical and optical crosstalk. However, such corrections may be combined following their calculation so that combined correction may then be applied so as to achieve acceptable crosstalk between views.

Figure 14:
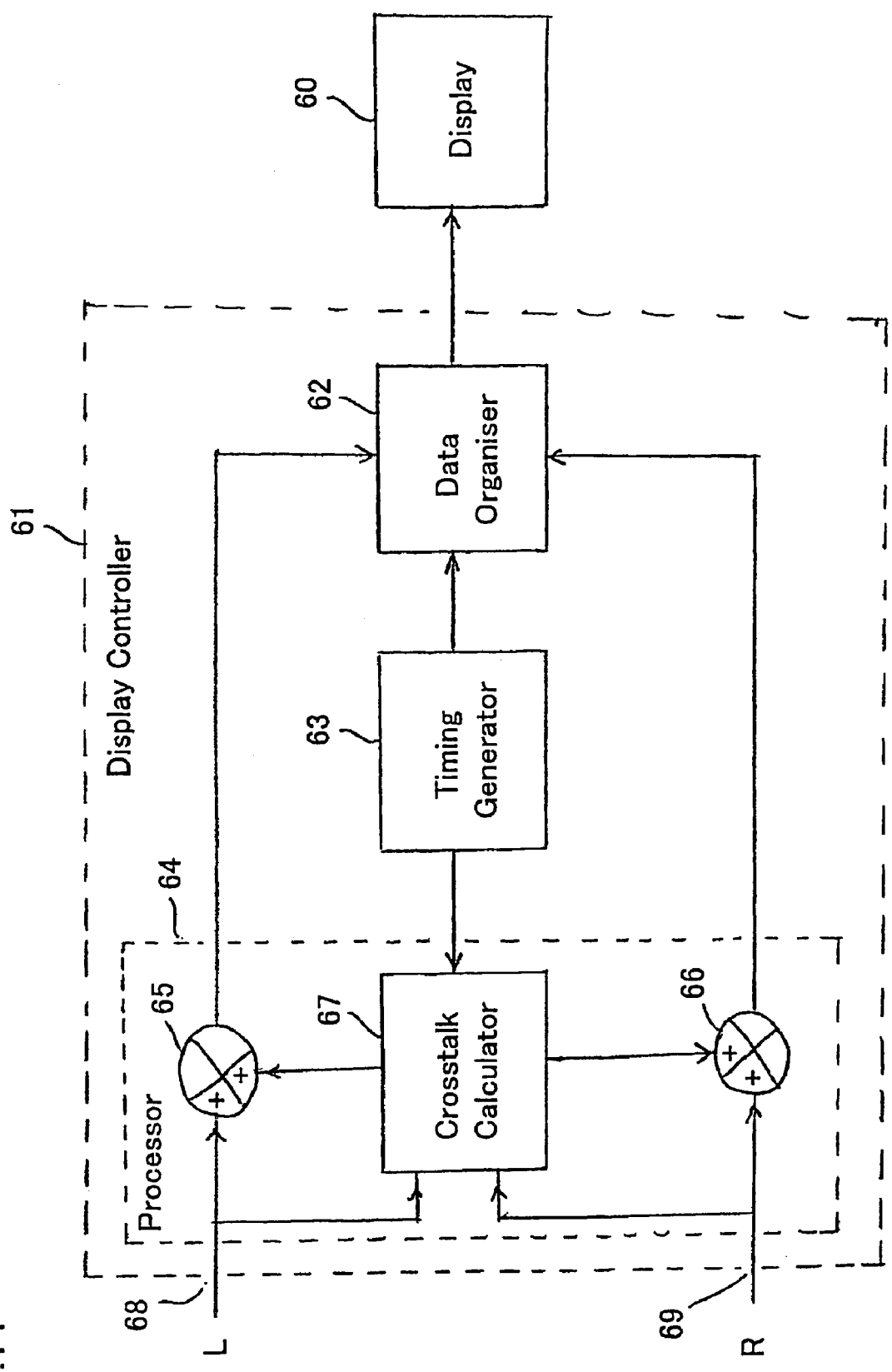
FIG. 14 is a schematic diagram of a display controller constituting an embodiment of the invention.

FIG. 14 illustrates a display 60, for example of any of the types described hereinbefore, and a display controller 61 which is capable of providing electrical and/or optical crosstalk correction. The controller 61 comprises a data organiser 62 controlled by a timing generator 63 and arranged to order the analogue or digital pixel values into the correct temporal order for refreshing the display 60. The data organiser 62 and the timing generator 63 may be of any suitable type, for example of known type, for supplying pixel data in the correct order to multiple viewer multiple view displays.

The controller 61 further comprises a processor 64 which performs crosstalk correction. The processor comprises summers 65 and 66 and a crosstalk calculator 67.

The display controller 61 and the display 60 are arranged to provide dual view operation so that two viewers may view mutually independent images which are simultaneously displayed by the display 60. Left (L) and right (R) image data are supplied to inputs 68 and 69 of the controller 61. The left and right image data are supplied to first inputs of the summers 65 and 66, respectively, and to respective inputs of the crosstalk calculator 67. The crosstalk calculator 67 calculates a crosstalk correction value for each image and supplies these values to second inputs of the summers 65 and 66. The crosstalk calculator 67 receives timing signals from the timing generator 63.

The outputs of the summers 65 and 66 are supplied to the data organiser 62, which organises the individual pixel data into the correct order for the display 60. For example, in the case where the left and right images are displayed as interlaced vertical strips one pixel wide by the display 60, the data organiser 62 supplies pixel data alternately from the summers 65 and 66 and, if necessary, discards pixel data so that each horizontal line of pixel data matches the horizontal resolution of the display 60.

In order to correct for electrical crosstalk, the crosstalk calculator 67 calculates correction values based on the pixel value of each pixel affected by electrical crosstalk and on the pixel value of each pixel contributing to the crosstalk of the affected pixel. Further, the crosstalk correction calculated by the calculator 67 also depends on the mapping between pixel intensity and grey level so that the amount by which the pixel grey level needs to be changed can be calculated in order to compensate more accurately for the crosstalk. FIG. 11 illustrates an example of such a mapping with intensity in arbitrary units being plotted against grey level represented from 0 to 255. The crosstalk correction values are therefore functions of the affected pixel data level, the affecting pixel data level and the mapping between pixel intensity and grey level.

Crosstalk as a function of the affected and affecting pixel level may be determined experimentally. In the case where the pixels have 256 grey levels (including black), it would be necessary to perform 255×255 measurements in order to determine the mapping for every possible combination of grey levels. However, a reduced number of measurements may be made and approximations such as interpolations may then be performed so as to reduce the burden of acquiring data representing the mapping.

It may be necessary or desirable to perform measurements to determine the mapping between pixel intensity and grey level for displays from each production line or possibly even for each individual display. Conversely, if the production processes are sufficiently consistent, it may only be necessary to perform measurements to determine the mapping for one example of the display 60.

Figure 15:
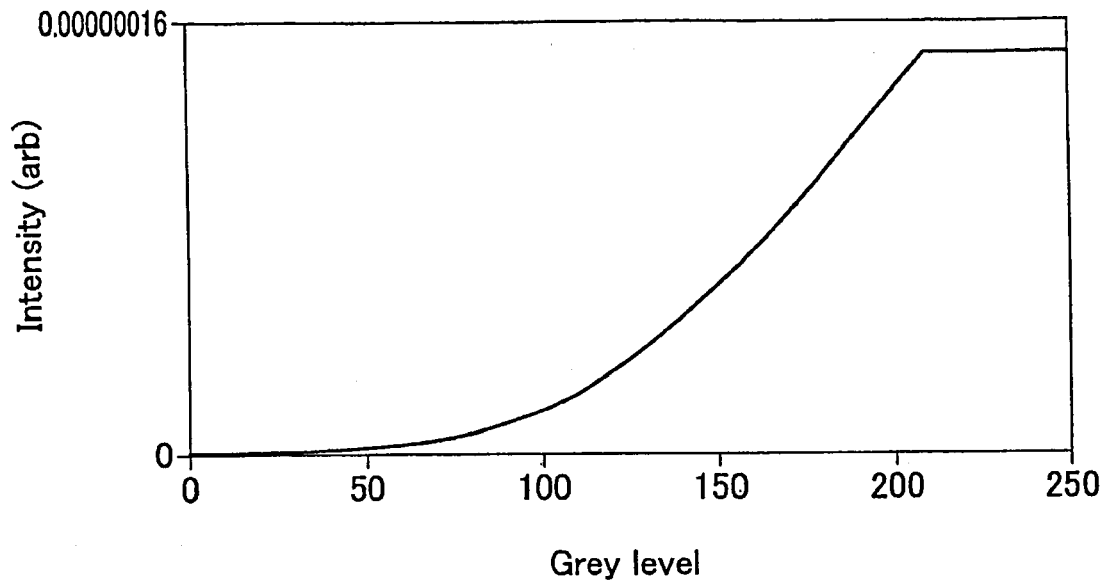
FIG. 15 is a graph illustrating a mapping between display pixel intensity and grey level.

Alternatively or additionally, the processor 64 may provide compensation for optical crosstalk. For example, in a typical multiple view display 60, optical crosstalk may be determined by the calculator 67 as a function of the pixel intensity of one or more adjacent pixels displaying a different image (or one or more adjacent pixels of the same colour as the affected pixel displaying a different image), the "level" of optical crosstalk (for example, the amount of optical diffraction and scattering), and the mapping between pixel intensity and grey level. By taking into account the mapping between pixel intensity and grey level, it is possible to improve the accuracy of correction, for example compared with an assumption that the mapping is linear. As shown in FIG. 15, the actual mapping is significantly non-linear so that correction is improved by the present technique.

In order to reduce crosstalk, the crosstalk calculator 67 determines the correction value required for each image and subtracts this from a predetermined constant grey level for all pixels. The result is then added to the images in the summers 65 and 66.

Crosstalk may be colour dependent, for example if it is caused by diffraction. For example, if such diffraction makes substantive contribution to the display crosstalk, it might be expected that crosstalk would be greater for blue light than for red light. In such situations, it is preferable for crosstalk to be calculated or derived independently for the different colours and for compensation to be different for the different colours. Thus, at least part of the compensation provided for crosstalk of each pixel may be derived from one or more other pixels of the same colour.

As an alternative or an addition to the crosstalk calculations described hereinbefore, the crosstalk calculator 67 adds a faint predetermined masking image such as noise or random text. The addition of such a masking image makes the crosstalk more difficult to interpret as a meaningful image and therefore reduces the crosstalk perceived by the viewers.

The masking image may be a static or unchanging image. Alternatively, the masking image may be one which changes with time if this is more appropriate to mask the crosstalk. For example, a changing image may be more appropriate to provide masking in the case of a non-static displayed image or images.

The level of the masking image is chosen so as to be just sufficient in order to make the crosstalk imperceptible. For example, the masking image may have a maximum brightness which is an order of magnitude higher than the maximum expected crosstalk brightness. For example, in the case of 0.4% crosstalk, a masking image having a maximum level which is about 5% of the maximum brightness of the display has been found to be effective.

Alternatively or additionally, the visibility of crosstalk may be reduced by adding a fixed intensity to the individual images. In particular, when either image is black, the visibility of crosstalk is higher because of the higher sensitivity of human vision to low level images caused by crosstalk. By adding a low level fixed intensity, particularly where an image is currently black, it is possible to obscure the crosstalk by moving it to a grey level range where human vision is less sensitive to the variations in grey level caused by crosstalk.

Such an arrangement requires relatively little image processing power and is therefore simple and cheap to implement. Although this technique is particularly suited to the situation where grey is added to a black screen, it may also be applied to non-black images and results in a small but generally acceptable reduction in contrast ratio.

An additional measure for reducing the visibility of crosstalk may be to reduce the brightness of the display in low ambient lighting conditions. For example, crosstalk (such as that visible on a black image) may be particularly visible when the ambient lighting level is low, for example at night when a display is used in a vehicle. By reducing the brightness of the display, such as by dimming a backlight or by means of image processing, the reduced brightness of crosstalk is less visible. In order to control this, a sensor such as a photodiode may be used to sense the ambient lighting intensity and to control dimming of the display. Alternatively, the ambient lighting conditions may be inferred from other parameters. For example, where the display is installed in a vehicle such as a car, the display may be arranged to be dimmed when the vehicle headlights are switched on.

Figure 16:
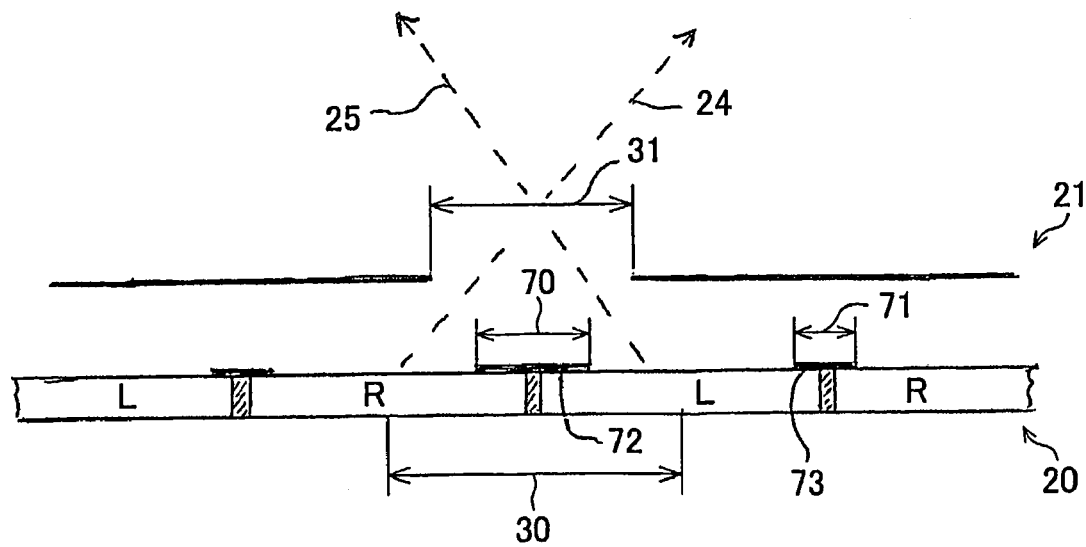
FIG. 16 shows a diagrammatic cross-sectional view of a multiple view display constituting an embodiment of the invention.

FIG. 16 illustrates another multiple viewer multiple view display comprising an LC panel 20 cooperating with a parallax barrier 21 to allow two viewers to view independent images in the viewing directions 24 and 25. The display is illustrated for dual view purposes with left (L) and right (R) image pixels arranged as columns so that the images are displayed on the panel 20 as interlaced vertical strips one pixel wide. The pixels have a horizontal pitch indicated at 30. The barrier slits have a width indicated at 31 which is substantially equal to the horizontal pixel aperture.

The LC panel 20 includes a black mask with portions such as 72 and 73 defining the horizontal apertures of the pixels. Each barrier slit is associated with two columns of pixels (for a dual view display) with the portion 72 of the black mask defining and being disposed between the apertures of the associated pixel columns. The black mask portions such as 73 define the other edges of the horizontal pixel apertures for horizontally adjacent pixels associated with different slits of the parallax barrier 21.

The horizontal width 70 of the black mask portions such as 72 is between approximately 32% and 48% of the pixel pitch 30 whereas the width 71 of the black mask portions 73 is between approximately 16% and 24% of the pixel pitch 30. In a typical example, the width 31 of the barrier slits is approximately 70% of the pixel pitch 30, the width 70 of the portions 72 of the black mask is substantially 40% of the pixel pitch 30 and the width 71 of the black mask portions 73 is substantially 20% of the pixel pitch 30. The slit width 31 is therefore substantially equal to the horizontal aperture of the pixels.

The use of relatively wide black mask portions 72 provide greater angular separation between viewing windows for a given separation between the panel pixel plane and the barrier slit plane. This allows a multiple viewer display to be provided and avoids any need to reduce the said separation. The use of thin fragile substrates is unnecessary so that manufacturing difficulties associated with such thin substrates are avoided. The use of relatively thin black mask portions 73 avoids or reduces any substantial loss in the horizontal spatial resolution of the panel 20.

The invention claimed is:

1. A multiple view display comprising: a spatial light modulator comprising a plurality of pixels (L, R) arranged to display a plurality of spatially interlaced images for viewing by respective different viewers in respective different directions with respect to the display; and a parallax optic cooperating with the modulator substantially to restrict light from the modulator modulated by the different images to the respective different directions, the modulator further comprising a black mask defining pixel apertures of the pixels (L, R) and having portions between pixel apertures, which are horizontally adjacent in the horizontal direction of the designed image orientation on the display, which portions are of at least two different widths, the parallax optic comprising a plurality of parallax elements, each of which cooperates with a respective group of pixels (L, R), wherein the display is a multiple viewer display and the width of each portion of the black mask between pixels (L, R) of the same group is greater than the width of each portion of the black mask between pixels (L, R) of different groups.

2. A display as claimed in claim 1, wherein each pixel has a corresponding horizontally striped colour filter covering the pixel.

3. A display as claimed in claim 1, wherein the pixels (L, R) are rectangular with major axes extending substantially in the horizontal direction.

4. A display as claimed in claim 1, wherein the pixels (L, R) have a vertical aperture substantially equal to one third of the horizontal aperture thereof.

5. A display as claimed in claim 1, wherein the parallax optic comprises a parallax barrier comprising a plurality of slits oriented in a vertical direction of the designed image orientation on the display.

6. A display as claimed in claim 5, wherein the horizontal width of the slits is greater than or equal to the horizontal pixel aperture.

7. A display as claimed in claim 5, wherein the horizontal width of the slits is substantially equal to the horizontal pixel aperture.

8. A display as claimed in claim 5, wherein the parallax barrier is disablable to provide a single view mode of operation and the horizontal width of the slits is less than the horizontal pixel aperture.

9. A display as claimed in claim 5, comprising a respective lens disposed at each slit.

10. A display as claimed in claim 9, wherein the lenses are converging lenses.

11. A display as claimed in claim 10, wherein the lenses are cylindrically converging lenses.

12. A display as claimed in claim 1, wherein the pixels (L,R) are arranged as rows extending in the horizontal direction and columns extending in a vertical direction of the designed image orientation on the display.

13. A display as claimed in claim 12, wherein the rows are arranged as groups of N adjacent rows, where N is an integer greater than one, the pixels (L,R) of each group having scan inputs connected to a common scan line for the group and data inputs connected to respective data lines which are common to all of the groups.

14. A display as claimed in claim 13, wherein in each group, the data inputs of pixels which are in a same one of the columns and which are adjacent each other are connected to adjacent ones of the data lines.

15. A display as claimed in claim 13, wherein N is equal to three.

16. A display as claimed in claim 1, wherein the width of each portion of the black mask between the pixels (L, R) of the same group is between substantially 32% and substantially 48% of the horizontal pixel pitch.

17. A display as claimed in claims 1, wherein the width of each portion of the black mask between the pixels (L, R) of different groups is between substantially 16% and substantially 24% of the horizontal pixel pitch.

18. A display as claimed in claim 1, wherein the parallax optic comprises a parallax barrier comprising a plurality of slits oriented in a vertical direction of the designed image orientation on the display.

19. A display as claimed in claim 18, wherein the horizontal width of the slits is substantially equal to the horizontal pitch aperture.

20. A display as claimed in claim 1, comprising a controller for supplying to the modulator pixel data in a form suitable for interlacing the images.

21. A display as claimed in claim 1, wherein the modulator comprises a light valve.

22. A display as claimed in claim 21, wherein the modulator comprises a liquid crystal device.

23. A display as claimed in claim 1, wherein the plurality of images comprises two images.

* * * * *